US009646602B2

(12) United States Patent
Sung et al.

(10) Patent No.: US 9,646,602 B2
(45) Date of Patent: May 9, 2017

(54) METHOD AND APPARATUS FOR IMPROVING DISORDERED VOICE

(71) Applicant: SNU R&DB FOUNDATION, Gwanak-ro, Gwanak-gu, Seoul (KR)

(72) Inventors: Myung Whun Sung, Seoul (KR); Tack Kyun Kwon, Kyun (KR); Hee Jin Kim, Gyeonggi-do (KR); Wook Eun Kim, Seoul (KR); Woo Il Kim, Incheon (KR); Mee Young Sung, Seoul (KR); Dong Wook Kim, Seoul (KR)

( * ) Notice: Subject to any disclaimer, the term of this patent is extended or adjusted under 35 U.S.C. 154(b) by 0 days.

(21) Appl. No.: 14/311,115

(22) Filed: Jun. 20, 2014

(65) Prior Publication Data

US 2014/0379348 A1    Dec. 25, 2014

(30) Foreign Application Priority Data

Jun. 21, 2013    (KR) .................... 10-2013-007191410

(51) Int. Cl.
    *G10L 13/04*    (2013.01)
    *G10L 25/75*    (2013.01)
    *G10L 25/60*    (2013.01)
    *G10L 15/02*    (2006.01)
    *G10L 25/27*    (2013.01)
    *G10L 25/15*    (2013.01)

(52) U.S. Cl.
    CPC .............. *G10L 13/04* (2013.01); *G10L 15/02* (2013.01); *G10L 25/15* (2013.01); *G10L 25/27* (2013.01); *G10L 25/60* (2013.01); *G10L 25/75* (2013.01); *G10L 2015/025* (2013.01)

(58) Field of Classification Search
    None
    See application file for complete search history.

(56) References Cited

U.S. PATENT DOCUMENTS

| 5,295,224 A | * | 3/1994 | Makamura | G10L 19/265 704/219 |
| 5,340,316 A | * | 8/1994 | Javkin | G09B 19/04 434/112 |
| 5,581,656 A | * | 12/1996 | Hardwick | G10L 19/087 704/258 |

(Continued)

FOREIGN PATENT DOCUMENTS

WO    WO 2013013319 A1 *    1/2013    ............. G10H 1/366

OTHER PUBLICATIONS

Niu, Xiaochuan, and Jan Ph van Santen. "Dual-channel acoustic detection of nasalization states." Interspeech. 2007.*

*Primary Examiner* — Pierre-Louis Desir
*Assistant Examiner* — Jonathan Kim
(74) *Attorney, Agent, or Firm* — AEON Law; Adam L. K. Philipp

(57) ABSTRACT

There is provided a method and an apparatus for processing a disordered voice. A method for processing a disordered voice according to an exemplary embodiment of the present invention includes: receiving a voice signal; recognizing the voice signal by phoneme; extracting multiple voice components from the voice signal; acquiring restored voice components by processing at least some disordered voice components of the multiple voice components by phoneme; and synthesizing a restored voice signal based on at least the restored voice components.

17 Claims, 9 Drawing Sheets

(56) References Cited

U.S. PATENT DOCUMENTS

| | | | | |
|---|---|---|---|---|
| 5,664,052 A * | 9/1997 | Nishiguchi | G10L 25/93 | 704/208 |
| 5,913,188 A * | 6/1999 | Tzirkel-Hancock | G10L 15/02 | 704/221 |
| 6,167,371 A * | 12/2000 | Miet | G10L 19/26 | 370/282 |
| 6,199,037 B1 * | 3/2001 | Hardwick | G10L 19/0212 | 704/208 |
| 6,219,637 B1 * | 4/2001 | Choi | G10L 19/02 | 704/223 |
| 6,310,646 B1 * | 10/2001 | Shi | H04N 17/00 | 324/95 |
| 6,850,882 B1 * | 2/2005 | Rothenberg | G10L 25/00 | 704/211 |
| 8,060,565 B1 * | 11/2011 | Swartz | G10L 13/00 | 704/4 |
| 2002/0072901 A1 * | 6/2002 | Bruhn | G10L 19/005 | 704/229 |
| 2005/0131679 A1 * | 6/2005 | Gigi | G10L 25/00 | 704/205 |
| 2006/0129390 A1 * | 6/2006 | Kim | G10L 17/26 | 704/220 |
| 2009/0316918 A1 * | 12/2009 | Niemisto | H04R 29/00 | 381/58 |
| 2010/0235170 A1 * | 9/2010 | Rothenberg | G09B 19/04 | 704/270 |
| 2011/0064253 A1 * | 3/2011 | Gran | H04R 25/453 | 381/312 |
| 2011/0182433 A1 * | 7/2011 | Takada | G10L 19/008 | 381/22 |
| 2012/0116772 A1 * | 5/2012 | Jones | G06F 19/3418 | 704/270 |
| 2013/0035940 A1 * | 2/2013 | Wan | G06K 9/00221 | 704/258 |
| 2013/0231942 A1 * | 9/2013 | Capik | G09B 5/06 | 705/2 |
| 2014/0195227 A1 * | 7/2014 | Rudzicz | G10H 1/366 | 704/231 |

* cited by examiner

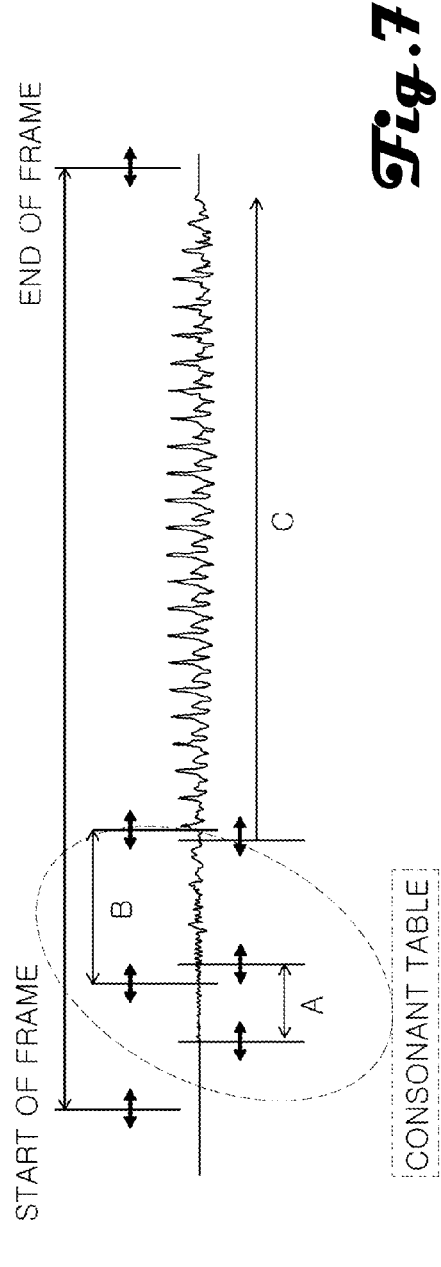
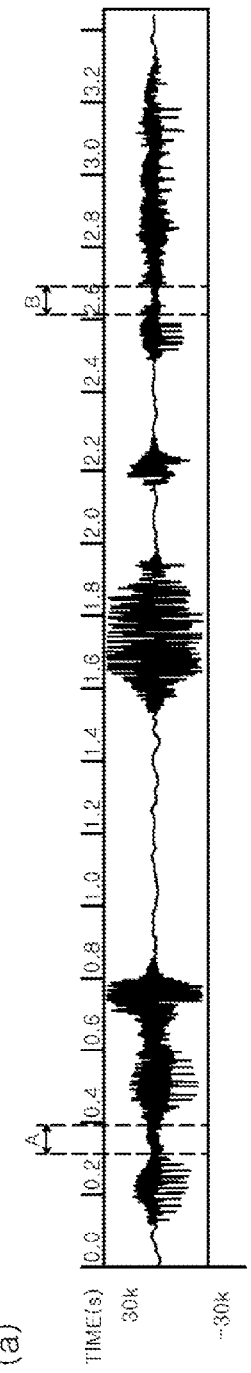
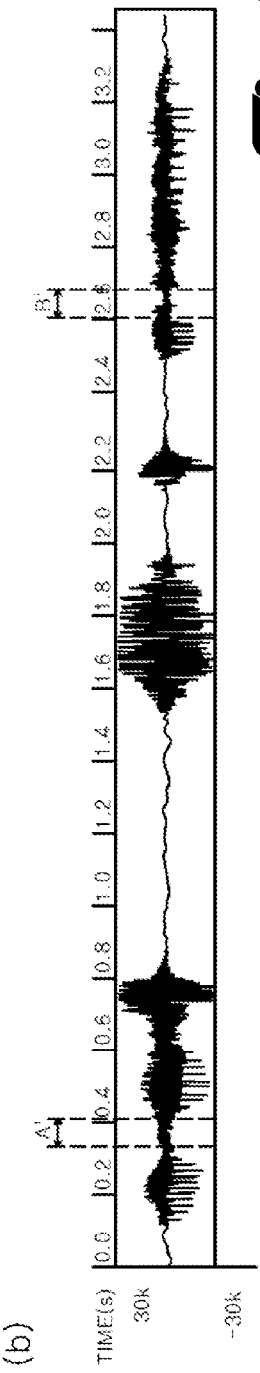

METHOD AND APPARATUS FOR IMPROVING DISORDERED VOICE

CROSS-REFERENCE TO RELATED APPLICATIONS

This application claims the priority of Korean Patent Application No. 2013-0071914 filed on Jun. 21, 2013, in the Korean Intellectual Property Office, the disclosure of which is incorporated herein by reference.

BACKGROUND OF THE INVENTION

Field of the Invention

The present invention relates to a method and an apparatus for processing a disordered voice and more particularly, to disordered voice processing method and an apparatus of restoring a disordered voice to a normal voice.

Description of the Related Art

When a speaker pronounces a word, air coming out of the bronchial tube passes through the vocal cords while generating a glottal wave. Here, the speaker pronounces a word while exhaling, and, thus, a noise (aspiration) caused by exhalation is contained in the glottal wave. While passing through the vocal tracts, this glottal wave causes an articulation phenomenon, and finally, during lip radiation to the air, a voice is generated.

During a process of generating a voice, while a glottal wave passes through the vocal tracts, an unintended pronunciation may be generated by various factors. In particular, if the human anatomy is abnormal, an unintended pronunciation is generated. Examples of factors that may have a negative effect on a voice generation process may include structural problems in lips, teeth, tongue, palate, rhinopharynx, and the like. Further, facial birth defects such as a cleft lip and a cleft palate may cause articulation disorders.

Such articulation disorders caused by anatomic abnormalities have been treated by speech therapies, physical therapies, surgery, and the like. However, despite the above-described treatments, misarticulation caused by articulation disorders occurs.

SUMMARY OF THE INVENTION

In view of the foregoing, an object of various exemplary embodiments of the present invention is to provide a disordered voice processing method and apparatus capable of converting misarticulation caused by articulation disorders into normal articulation.

Another object of various exemplary embodiments of the present invention is to provide a voice processing method and apparatus that converts misarticulation input to a mobile phone or a landline phone into a normal voice and thus enables accurate speech during a phone conversation, resulting in a high-quality voice communication.

The objects of the present invention are not limited to the aforementioned objects, and other objects, which are not mentioned above, will be apparent to those skilled in the art from the following description.

In order to solve the above objects, the disordered voice processing method according to an embodiment of the present invention includes a step of receiving a voice signal; a step of recognizing the voice signal on a basis of a phoneme; a step of extracting multiple voice components from the voice signal; a step of acquiring restored voice components by processing at least some of disordered voice components of the multiple voice components on a basis of a phoneme; and a step of synthesizing a restored voice signal based on at least the restored voice components.

According to still another characteristic of the present invention, the multiple voice components include vocal tract components and glottal components, and the disordered voice components are vocal tract components.

According to still another characteristic of the present invention, the disordered voice processing method further includes a step of classifying the recognized voice signal into a normal voice signal and a disordered voice signal, in which the acquiring step includes acquiring the restored voice component by processing the disordered voice components with respect to a disordered voice signal on a basis of a phoneme.

According to still another characteristic of the present invention, the classifying step includes classifying the disordered voice signal by applying heuristics.

According to still another characteristic of the present invention, the classifying step includes determining whether or not the voice signal is disordered on a basis of a phoneme.

According to still another characteristic of the present invention, the classifying step includes is based on the extracted multiple voice components.

According to still another characteristic of the present invention, the disordered voice processing method further includes adjusting amplitude or a length of the disordered voice signal.

According to still another characteristic of the present invention, the disordered voice component is a disordered voice component of a consonant, and in the step of acquiring restored voice components, the disordered voice components are adjusted with respect to at least one of aspiration, tense, or turbulence.

According to still another characteristic of the present invention, the disordered voice components are disordered voice components with respect to a consonant, a vowel, or a combination of a consonant and a vowel.

According to still another characteristic of the present invention, the step of synthesizing a restored voice signal uses Linear Predictive Coding (LPC).

According to still another characteristic of the present invention, the voice signal includes an oral sound signal and a nasal sound signal.

According to still another characteristic of the present invention, the extracting step includes extracting the multiple voice components using Linear Predictive Coding (LPC).

According to still another characteristic of the present invention, a step of generating the restored voice components includes generating the restored voice components based on a phoneme characteristic table.

According to still another characteristic of the present invention, the disordered voice processing method further includes filtering the restored voice signal to compensate the restored voice components.

According to still another characteristic of the present invention, the disordered voice processing method further includes filtering the restored voice signal through a lip radiation filter.

In order to solve the above objects, the disordered voice processing apparatus according to an embodiment of the present invention includes an input unit configured to input a voice signal; a memory configured to store the voice signal; and a processor configured to generate a restored voice signal from the voice signal, in which the processor is configured to recognize the voice signal on a basis of a phoneme; to extract multiple voice components from the voice signal; to acquire restored voice components by processing at least some disordered voice components of the multiple voice components on a basis of a phoneme; and to synthesize a restored voice signal based on at least the restored voice components.

According to still another characteristic of the present invention, the multiple voice components include vocal tract components and glottal components, and the disordered voice components are vocal tract components.

According to still another characteristic of the present invention, the processor is configured to classify the voice signal into a normal voice signal and a disordered voice signal.

According to still another characteristic of the present invention, the processor is configured to adjust amplitude or a length of the disordered voice signal.

According to still another characteristic of the present invention, the voice signal includes an oral sound signal and a nasal sound signal.

In order to solve the above objects, the communication device according to an embodiment of the present invention includes a disordered voice processing apparatus described in any one of claims 15, 16 and 17, and configured to receive a voice signal and output a restored voice signal; and a speaker configured to convert the restored voice signal of the disordered voice processing apparatus into a sound wave and output the sound wave.

There are at least following effects according to embodiments of the present invention.

It is possible to provide a disordered voice processing method and apparatus capable of converting misarticulation caused by articulation disorders into normal articulation.

Further, it is possible to provide a voice processing method and apparatus that converts misarticulation input to a mobile phone or a landline phone to a normal voice and thus enables accurate speech during a phone conversation, resulting in a high-quality voice communication.

The effects of the present invention are not limited to the aforementioned examples, and other various effects are included in the present specification.

BRIEF DESCRIPTION OF THE DRAWINGS

The above and other aspects, features and other advantages of the present invention will be more clearly understood from the following detailed description taken in conjunction with the accompanying drawings, in which:

FIG. 7 illustrates a chart drawn for explaining an analysis of an example consonant as a disordered voice component;

FIG. 8 illustrates charts drawn for explaining a result of processing an example disordered voice related to a nasal sound;

DETAILED DESCRIPTION OF THE PREFERRED EMBODIMENT

Figure 1:
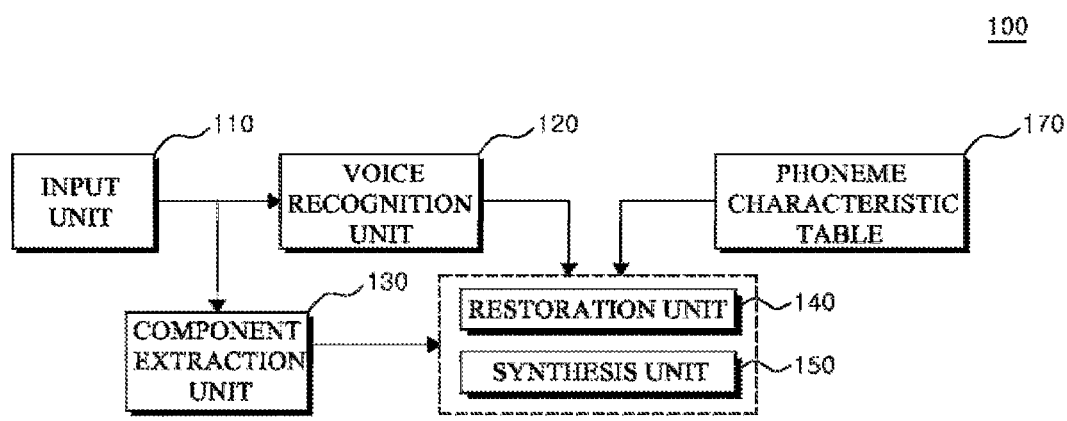
FIG. 1 is a block diagram of a disordered voice processing apparatus according to an exemplary embodiment of the present invention.

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Although first, second, and the like are used in order to describe various components, the components are not limited by the terms. The above terms are used only to discriminate one component from the other component. Therefore, a first component mentioned below may be a second component within the technical spirit of the present invention.

For the specification, when any one element transmits data or signal to other elements, it means that the elements can directly transmit the data or signal to other elements or can transmit the data or signal to other elements through another element.

The steps of a method or algorithm described in connection with the embodiments disclosed in the present specification may be embodied directly in hardware, in a software module executed by a processor, or in a combination of the two. The software module may reside in RAM memory, flash memory, ROM memory, EPROM memory, EEPROM memory, register, hard disk, a removable disk, a CD-ROM, or any other form of storage medium known in the art. An exemplary storage medium is coupled to the processor such that the processor can read information from, and write information to, the storage medium. Otherwise, the storage medium may be integrated with the processor. The processor and the storage medium may reside in an application-specific integrated circuit (ASIC). The ASIC may reside in a user terminal. Otherwise, the processor and the storage medium may reside as discrete components in a user terminal.

Further, each block or each step may indicate a part of a module, a segment, or a code including one or more executable instructions for implementing specific logical function(s). Furthermore, it should be noted that in some alternative embodiments, functions described in blocks or steps can be generated out of the order. For example, two blocks or steps illustrated continuously may be implemented simultaneously, or the blocks or steps may be implemented in reverse order according to corresponding functions.

The present invention has been described in more detail with reference to the exemplary embodiments, but the present invention is not limited to the exemplary embodiments. It will be apparent to those skilled in the art that various modifications can be made without departing from the technical sprit of the invention. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

It will be easily recognized by those skilled in the art that a disordered voice processing method according to various exemplary embodiments of the present invention is not limited to the Korean language but can be applied to various languages. Further, it will be easily recognized by those skilled in the art that the disordered voice processing method according to various exemplary embodiments of the present invention can be applied to any disorders which may cause misarticulation in addition to various disorders to be described herein.

FIG. 1 is a block diagram of a disordered voice processing apparatus according to an exemplary embodiment of the present invention. Referring to FIG. 1, a disordered voice processing apparatus 100 according to an exemplary embodiment of the present invention includes an input unit 110, a voice recognition unit 120, a component extraction unit 130, a restoration unit 140, and a synthesis unit 150.

The disordered voice processing apparatus 100 is configured to analyze a component of misarticulation caused by a disorder, restore the misarticulation to normal articulation through a digital signal process, and output the normal articulation, and can be implemented with constituent parts for voice recognition, voice analysis, and voice synthesis.

Hereinafter, a disordered voice means misarticulation caused by a disorder and has at least some different components from a normal voice. A configuration for analyzing and restoring a disordered voice will be explained in detail with other constituent parts as illustrated in FIG. 1.

The input unit 110 in FIG. 1 receives a voice signal through the disordered voice processing apparatus 100. A voice signal is an electric signal reflecting intensity and characteristics of a voice. The input unit 110 can receive a voice signal by receiving an analogue voice through, for example, a microphone, and converting an analogue voice signal into a digital voice signal. On the other hand, the input unit 110 may receive a digital voice signal from an external device. Hereinafter, a voice signal shall mean a digital voice signal unless referred to otherwise.

The voice signal received by the input unit 110 may be an oral sound signal, a nasal sound signal, or a voice signal in which an oral sound and a nasal sound are not separated. A configuration for receiving a voice signal which is separated into an oral sound signal or a nasal sound signal will be explained later in detail with reference to FIG. 4 and FIG. 5.

The voice recognition unit 120 recognizes the received voice. The voice recognition unit 120 can recognize the received voice using various methods. The voice recognition unit 120 may use, for example, an NN (Neural Network) recognition algorithm, a DTW (Dynamic Time warping) recognition algorithm, a Support Vector Machine (SVM) or Hidden Markov Model (HMM) recognition algorithm, or the like and can be implemented by other various existing voice recognition methods.

The NN (Neural Network) recognition algorithm first generates a large-sized coefficient matrix through recognition learning of all characteristic parameters such as phonemes, syllables, or words and then calculates an output index by directly applying the characteristic parameters of a newly input voice to the previously generated coefficient matrix. The DTW (Dynamic Time warping) recognition algorithm is a pattern matching algorithm that allows non-linear expansion and contraction on a time axis. In the HMM (Hidden Markov Model) recognition algorithm, a HMM for every voice signal characteristic parameter to be recognized is generated at the beginning through recognition learning, and a similar HMM is generated for a newly input voice characteristic parameter and then, the most similar model is found by respective comparisons with the previously generated HMMs.

The voice recognition unit 120 of the disordered voice processing apparatus 100 according to the exemplary embodiment of the present invention may be configured to refer to a voice corpus in order to recognize a phoneme in a disordered voice. The voice corpus may be a voice corpus containing various disordered voices, or may be a disordered voice corpus relevant to a specific disorder.

The voice recognition unit 120 recognizes the currently input voice signal on a basis of a phoneme using the learned classification algorithm. Further, the voice recognition unit 120 can separate the voice into phonemes and output the separated phonemes or phoneme information containing a phoneme section through the component extraction unit 130 and the restoration unit 140.

The voice recognition unit 120 can use "model adaptation" to recognize phoneme. The voice recognition unit 120 may use 2-step adaptation scheme, including MAP (Maximum A Posterior) adaptation and MLLR (Maximum Likelihood Linear Regression) adaptation. The MAP adaptation may use simulation speech and the MLLR adaptation may use the speaker speech. The combination of simulation speech and the speaker speech enhances the phoneme recognition accuracy. The use of simulation speech combined with the speaker speech has coherence between the disordered person and the normal person. Such model adaptation is more suitable for the recognition of the disordered person. The use of conventional model adaptation may suffer very low recognition accuracy.

In case that the used language is Korean, the voice recognition unit 120 can use a syllable-based phoneme network to facilitate the voice recognition. For example, some consonants cannot precede a vowel in a syllable and limited number of consonants can follow a vowel in a syllable.

The use of 2-step adaptation scheme and the syllable-based phone network increases the success rate of the phoneme recognition. The phoneme recognition accuracy increased 31.68% in average.

The component extraction unit 130 extracts multiple voice components from the voice signal received from the input unit 110. The voice components extracted by the component extraction unit 130 may vary depending on a filter or an algorithm used in the restoration unit 140 or the synthesis unit 150, and they are not limited in a specific filter or algorithm. The component extraction unit 130 extracts the voice components from the voice signal using, but not limited to, a source-filter decomposition algorithm, an articulation synthesis algorithm, a formant synthesis algorithm, Linear Predictive Coding (LPC), MCFF (Mel-frequency cepstral coefficients), a Discrete Wavelet Transform (DWT) filter, and the like, and may use various algorithms. The component extraction unit 130 may use the Linear Predictive Coding method and extract the voice components by decomposing the voice signal with glottal parameters or vocal tract filter parameters.

The component extraction unit 130 of the voice processing apparatus according to the exemplary embodiment of the present invention extracts a source component and a filter component from the voice signal by the source-filter decomposition algorithm. The source component of the voice signal may be, for example, a glottal component or a glottal parameter, and the filter component may be, for example, a vocal tract component or a vocal tract filter parameter. The component extraction unit 130 outputs the extracted voice components to the restoration unit 140.

The restoration unit 140 performs a restoration process to a disordered voice. The restoration unit 140 receives phonemes separated from the voice recognition unit 120 or phoneme information containing a phoneme section and the multiple voice components from the component extraction unit 130. The restoration unit 140 processes the received voice components on a basis of a phoneme and acquires restored voice components. The voice components processed by the restoration unit 140 may be disordered voice components.

The disordered voice component refers to a component that constitutes a disordered voice, among multiple voice components that constitute a phoneme. A configuration for classifying normal voice components and disordered voice components from the multiple voice components will be explained in detail with reference to FIG. 2. The disordered voice components may vary depending on a kind of a disorder. In a disordered voice, if a glottis is normal but an articulation place or energy is abnormal, a voice component is classified into a glottal component and a vocal tract component as described above, and the vocal tract component may be determined as a disordered voice component. On the contrary, if a glottis is disordered, a glottal component can be regarded as a disordered voice component. Hereinafter, there will be explained a case where a vocal tract component is a disordered voice component.

Further, the disordered voice component may be a disordered voice component with respect to a consonant, a vowel, or a combination of a consonant and a vowel.

For example, a voice component with respect to a consonant may be a voice component involved in aspiration, tense, turbulence, and the like and a voice component with respect to a consonant may be a voice component in a frequency band or a time band. A voice component with respect to a consonant or a vowel may be a voice component which can express multiple formant frequencies, a template bandwidth, and the like, in a frequency band.

The restoration unit 140 can restore the disordered voice component to a normal voice component with reference to a phoneme characteristic table 170. The phoneme characteristic table may contain restoration information about disordered voice components and normal voice components. The restoration unit 140 can restore a disordered voice component to a normal voice component by adjusting a formant frequency, a template bandwidth, and the like of the disordered voice component with reference to the phoneme characteristic table 170. Otherwise, a disordered voice component can be restored to a normal voice component by adjusting the disordered voice component in a time band or a frequency band with respect to at least one of aspiration, tense, turbulence, and the like. For example, a voice component with respect to aspiration can be restored by adjusting the amplitude of a time band.

The restoration unit 140 may adjust duration of a phoneme in a time domain or may adjust a formant between a consonant and a vowel that connects phonemes.

In the restoration unit 140, adjustment of a disordered voice component may be carried out to minimize a resonance error, such as a hyper nasal sound, and distortion of articulation, and to implement compensation and displacement of articulation and omission or addition of a nasal sound. The restoration unit 140 can achieve the above-described implementation goals by converting a disordered voice component by various methods so as to acquire a restored voice component. A configuration of the restoration unit 140 for restoring a disordered voice component will be explained later in detail with reference to FIG. 4 to FIG. 8.

The synthesis unit 150 synthesizes a restored voice signal based on the restored voice component from the restoration unit 140. The synthesis unit 150 can generate a restored voice signal by synthesizing a restored voice component and other voice components.

The synthesis unit 150 can synthesize a restored voice signal using various algorithms. The synthesis unit 150 can synthesize a voice by the algorithm as used by the component extraction unit 130 for extracting a voice component. For example, the synthesis unit 150 can synthesize a restored voice signal using an articulation synthesis, a formant synthesis, a linear predictive coding synthesis, and the like.

The articulation synthesis algorithm converts each phoneme into a nerve-driven command and converts the nerve-driven command into information for determining a movement of an articulatory organ, a position of the articulatory organ, and a vocal tract shape so as to synthesize a voice. The linear predictive coding synthesis uses a formant component of a voice as a coefficient for linear predictive coding. Hereinafter, for convenience of explanation, there will be explained a case where the synthesis unit 150 uses the formant synthesis.

Meanwhile, when the present invention is implemented, it is obvious that various voice synthesis algorithms can be applied as being combined or mixed with each other and can be linked and driven with various existing voice processing methods in various ways, and also the exemplary embodiments can be carried out independently of or in connection with each other.

The synthesis unit 150 synthesizes an excitation signal as a glottal component and the restored voice component and outputs a restored voice signal. For example, the synthesis unit 150 can synthesize a restored voice signal by synthesizing a glottal component as a normal voice component and a vocal tract component of which a formant frequency is adjusted. In the restored voice signal, the disordered component is restored, and, thus, articulation or pronunciation can be further improved.

Figure 2:
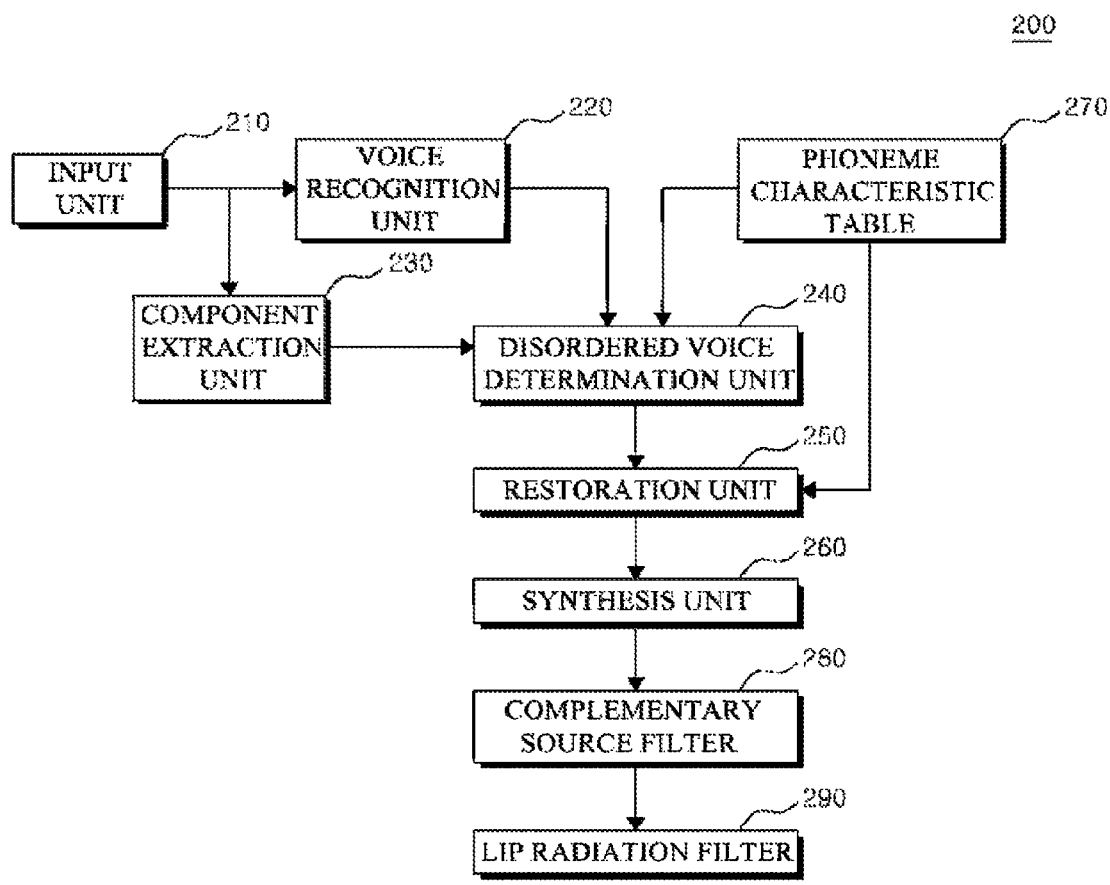
FIG. 2 is a block diagram of a disordered voice processing apparatus according to another exemplary embodiment of the present invention.

FIG. 2 is a block diagram of a disordered voice processing apparatus according to another exemplary embodiment of the present invention. A disordered voice processing apparatus 200 includes an input unit 210, a voice recognition unit 220, a component extraction unit 230, a phoneme characteristic table 270, a disordered voice determination unit 240, a restoration unit 250, and a synthesis unit 260, a complementary source filter 280, and a lip radiation filter 290.

The input unit 210, the voice recognition unit 220, the component extraction unit 230, and the synthesis unit 260 in FIG. 2 are substantially the same as the input unit 110, the voice recognition unit 120, the component extraction unit 130, and the synthesis unit 150 as illustrated in FIG. 1, and, thus, redundant explanation thereof will be omitted.

The disordered voice determination unit 240 determines whether or not some of multiple phonemes of a voice signal are misarticulation or a disordered voice. The disordered voice determination unit 240 receives information of a phoneme, a syllable, or a word from the voice recognition unit 220, and receives multiple voice components from the component extraction unit 230.

The disordered voice determination unit 240 can classify a normal voice and a disordered voice using at least one algorithm. The disordered voice determination unit 240 can determine at least one of the recognized phoneme, syllable, and word of the voice as an incorrectly pronounced phoneme. The disordered voice determination unit 240 can determine a disordered voice with reference to a voice component from the component extraction unit 230 and the phoneme characteristic table 270. For example, the disordered voice determination unit 240 can determine a disordered voice by comparing the received voice component with a voice component in the phoneme characteristic table 270. The phoneme characteristic table 270 contains phonemes which are often pronounced incorrectly as for a specific disorder, and, thus, the disordered voice determination unit 240 can identify a disordered voice with reference to the phoneme characteristic table 270.

Further, the disordered voice determination unit 240 determines whether a voice component of the disordered voice is a normal voice component or a disordered voice component. As for a voice determined as misarticulation or a disordered voice, if components of the voice are analyzed, only some voice components may cause a disorder. For example, a glottal component is normal but a vocal tract component may be a cause of misarticulation. The disordered voice determination unit 240 can determine which of voice components is a disordered voice component by analyzing the voice components. A configuration of the disordered voice determination unit 240 for determining a disordered voice component will be explained later in detail with reference to FIG. 5B to FIG. 6.

The disordered voice determination unit 240 may use heuristics for determining a disordered voice or a disordered voice component. The heuristics may include heuristics for determining an incorrectly pronounced phoneme by analyzing a phoneme, a syllable, and a word, and heuristics for determining a disordered voice with reference to the phoneme characteristic table 270. For example, if a speaker continuously differently pronounces a phonetic symbol /i/, heuristics is used for determining that the phonetic symbol /i/ corresponds to an intended pronunciation. Otherwise, heuristics may be used for determining that a continuously repeated nasal sound corresponds to a disordered voice.

The restoration unit 250 acquires a restored voice component by processing a disordered voice component of a voice determined as a disordered voice by the disordered voice determination unit 240. That is, the restoration unit 250 does not process all voice components, but can acquire a restored voice component of only a voice determined as a disordered voice by the disordered voice determination unit 240. Further, the restoration unit 250 acquires a restored voice component by processing only a disordered voice component among multiple voice components of a disordered voice. As described above, the disordered voice processing apparatus 200 according to an exemplary embodiment of the present invention can reduce distortion in disordered voice restoration by selectively restoring only a disordered voice component as a cause of misarticulation.

The synthesis unit 260 synthesizes a restored voice signal based on the restored voice component from the restoration unit 250. The synthesis unit 260 can generate a restored voice signal by synthesizing a restored voice component, a disordered voice component, and other voice components.

The disordered voice processing apparatus 200 according to another exemplary embodiment of the present invention may further include the complementary source filter 280 and the lip radiation filter 290.

The complementary source filter 280 has a function of complementing a glottal parameter or an excitation signal which can be weakened during the process of the restoration unit 250 by processing the restored voice signal. For example, the complementary source filter 280 can be implemented by a glottal simulation filter.

The lip radiation filter 290 is a filter for implementing an effect occurring when a sound comes out of the mouth. That is, a sound radiated from the mouth spreads in all directions in the air, and, thus, the sound is decreased in energy while being radiated. A great decrease in energy occurs in a low energy band rather than a high frequency band. Therefore, such a radiation effect can serve as "a high-pass filter" that receives only energy in a high frequency band and, thus, the lip radiation filter 290 can be implemented by, for example, a primary high-pass filter.

The restored voice signal from the synthesis unit 260 can be processed and output through the complementary source filter 280 and the lip radiation filter 290.

Figure 3:
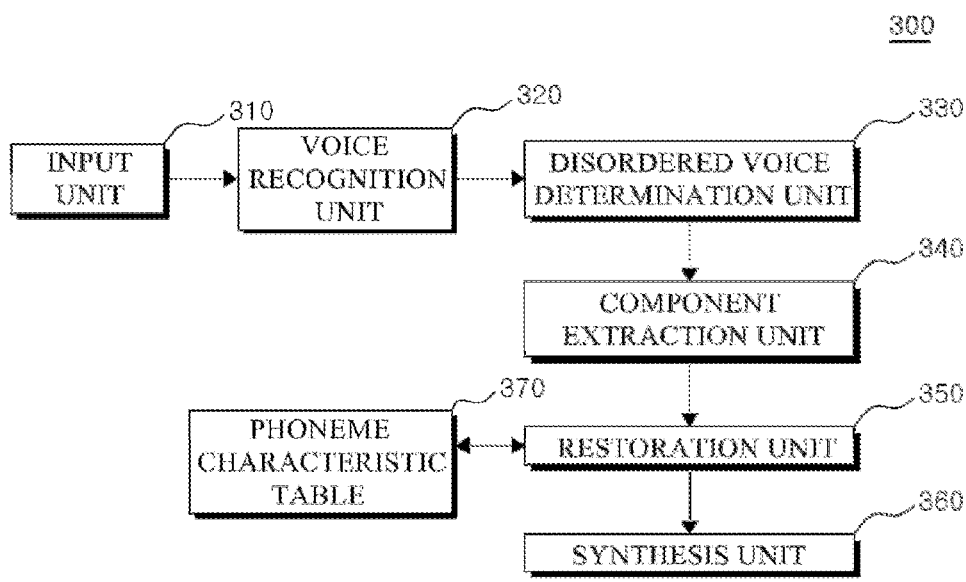
FIG. 3 is a block diagram of a disordered voice processing apparatus according to yet another exemplary embodiment of the present invention.

FIG. 3 is a block diagram of a disordered voice processing apparatus according to yet another exemplary embodiment of the present invention. Referring to FIG. 3, a disordered voice processing apparatus 300 includes an input unit 310, a voice recognition unit 320, a disordered voice determination unit 330, a component extraction unit 340, a restoration unit 350, a phoneme characteristic table 370, and a synthesis unit 360. The restoration unit 350 and synthesis unit 360 in FIG. 3 are substantially the same as the restoration unit 140 and the synthesis unit 150 as illustrated in FIG. 1, and, thus, redundant explanation thereof will be omitted.

Referring to FIG. 3, a voice signal from the input unit 310 is output to the voice recognition unit 320, and a voice recognized by the voice recognition unit 320 is output to the disordered voice determination unit 330. The disordered voice determination unit 330 receives the recognized voice and determines a disordered voice, and outputs the disordered voice and a normal voice to the component extraction unit 340.

In the disordered voice processing apparatus 300 according to the yet another exemplary embodiment of the present invention as illustrated in FIG. 3, the constituent parts from the input unit 310 to the component extraction unit 340 are connected in series. The disordered voice processing apparatus 300 configured in series extracts and restores a component of only an input voice which is recognized and determined as a disordered voice, and synthesizes a restored voice signal.

The disordered voice processing apparatuses 100 and 200 as illustrated in FIG. 1 and FIG. 2 are configured in parallel, and, thus, voice signals received by the input units 110 and 210 are output to both of the voice recognition units 120 and 220 and the component extraction units 130 and 230. Herein, the voice recognition units 120 and 220 recognize all of voice signals, and the component extraction units 130 and 230 extract voice components from all of the voice signals.

Referring to FIG. 3 again, the disordered voice processing apparatus 300 according to the yet another exemplary embodiment of the present invention is different in that all of voice signals from the input unit 310 are recognized by the voice recognition unit 320 but a voice component is extracted from a disordered voice only.

Figure 4:
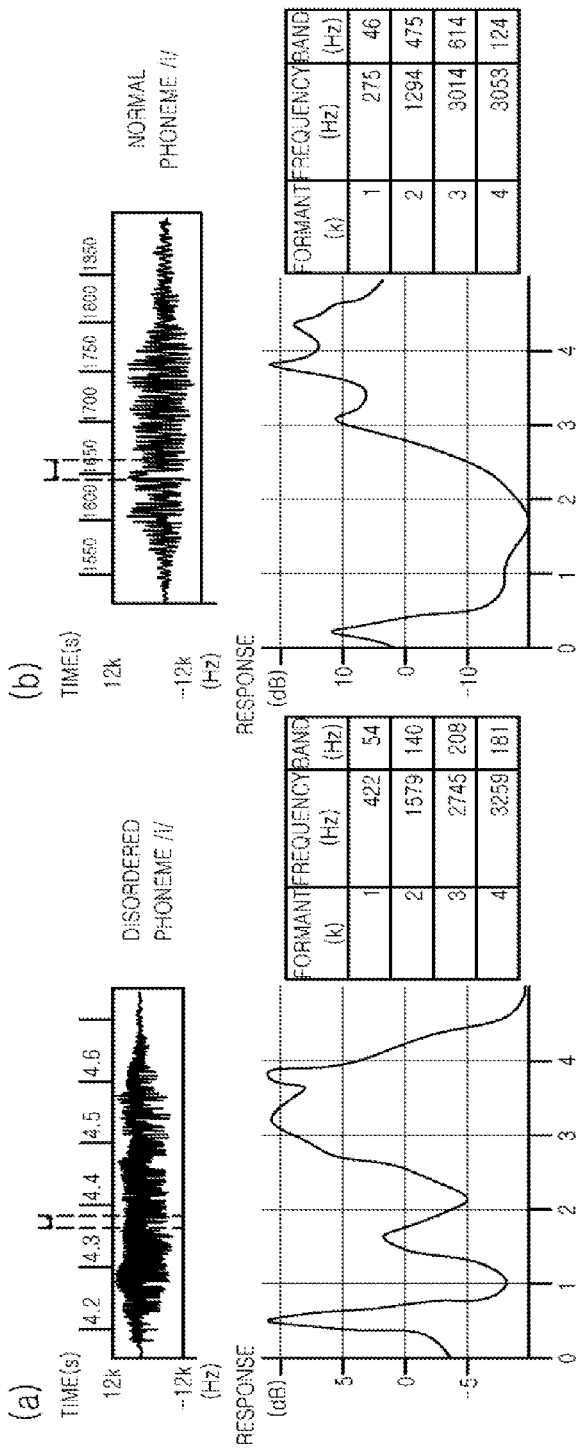
FIG. 4 illustrates charts drawn for explaining an analysis of an example vowel as a disordered voice component.

FIG. 4 illustrates charts drawn for explaining an analysis of an example vowel as a disordered voice component. Referring to FIG. 4, (a) of FIG. 4 illustrates that a chart about a disordered phoneme /i/ is divided into a time domain and a frequency domain and also illustrates a table of formant frequency and band. (b) of FIG. 4 illustrates that a chart about a normal phoneme /i/ is divided into a time domain and a frequency domain and also illustrates a table of formant frequency and band.

Referring to (a) of FIG. 4 regarding a disordered voice, there is illustrated a chart of the frequency domain corresponding to a section within a dotted line in the time domain. A section can be determined as 5 to 40 milliseconds (ms). Further, as for a disordered voice, a section can be determined differently for each of a consonant and a vowel. For example, a section for a consonant may be shorter than a section for a vowel, and may be, for example, 5 to 20 ms. The section for a vowel may be determined as 10 to 40 ms. According to the analysis of the chart of the frequency domain corresponding to the section within the dotted line, a first formant has a formant frequency of 422 Hz and a band of 54 Hz. A second formant has a formant frequency of 1579 Hz and a band of 140 Hz, and a third formant and a fourth formant have formant frequencies of 2745 Hz and 3269 Hz and bands of 208 Hz and 181 Hz, respectively. Four formant frequencies and bands in one section can constitute a single disordered voice component.

Referring to (b) of FIG. 4 regarding a normal voice, there is illustrated a section in the time domain chart corresponding to the section within a dotted line as illustrated in (a) of FIG. 4. According to the analysis of a chart of the frequency domain corresponding to this section, a first formant has a formant frequency of 275 Hz and a band of 46 Hz. A second formant has a formant frequency of 1294 Hz and a band of 475 Hz, and a third formant and a fourth formant have formant frequencies of 3014 Hz and 3053 Hz and bands of 614 Hz and 124 Hz, respectively.

By comparison in a formant frequency between the disordered voice component and the normal voice component, the first formant frequency and the second formant frequency are higher by about 200 Hz in the disordered voice, and a bandwidth of the first formant is similar but a bandwidth of the second formant is narrower by about 300 Hz in the disordered voice. A bandwidth of the third formant is narrower in the disordered voice.

As described above, the restoration unit of the disordered voice processing apparatus according to an exemplary embodiment of the present invention can restore a disordered voice component with reference to a phoneme characteristic table. For example, formant information of a normal voice /i/ is stored in the phoneme characteristic table, and the restoration unit processes a disordered voice component with reference to the phoneme characteristic table so as to generate a restored voice component. For example, the restoration unit can adjust a formant frequency of a first formant in the disordered voice component from 422 Hz to about 275 Hz, a bandwidth of a second formant from 140 Hz to about 475 Hz, and a bandwidth of a third formant from 208 Hz to about 600 Hz. The restoration unit can generate and output a restored voice component based on the adjusted formant frequencies and bandwidths.

Further, referring to the disordered voice processing apparatus according to another exemplary embodiment of the present invention, the disordered voice processing apparatus receives voices from an input unit divided into a nasal sound and an oral sound and processes each nasal sound and oral sound.

Figure 5A:
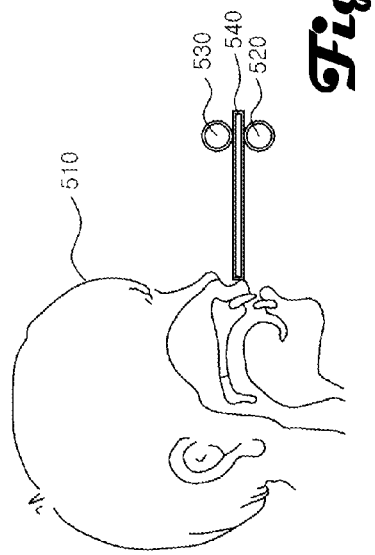
FIG. 5A is a conceptual diagram for explaining an input unit of a disordered voice processing apparatus according to still another exemplary embodiment.

FIG. 5A is a conceptual diagram for explaining an input unit of a disordered voice processing apparatus according to still another exemplary embodiment of the present invention. Referring to FIG. 5A, a speaker 510, a first input unit 520, a second input unit 530, and a separation means 540 are illustrated. An input unit of the disordered voice processing apparatus according to the still another exemplary embodiment may include the first input unit 520 and the second input unit 530.

A voice of the speaker 510 can be divided into an oral sound and a nasal sound, and the first input unit 520 is configured to receive an oral sound of the speaker 510 and the second input unit 530 is configured to receive a nasal sound of the speaker 510. The input unit may include the separation means 540 in order to receive an oral sound and a nasal sound of the speaker 510 separated from each other.

If the disordered voice processing apparatus according to the still another exemplary embodiment receives a voice in which an oral sound and a nasal sound are separated, a disordered voice can be restored into a normal voice more efficiently. Hereinafter, a method of separating and processing an oral sound and a nasal sound will be explained in more detail.

Figure 5B:
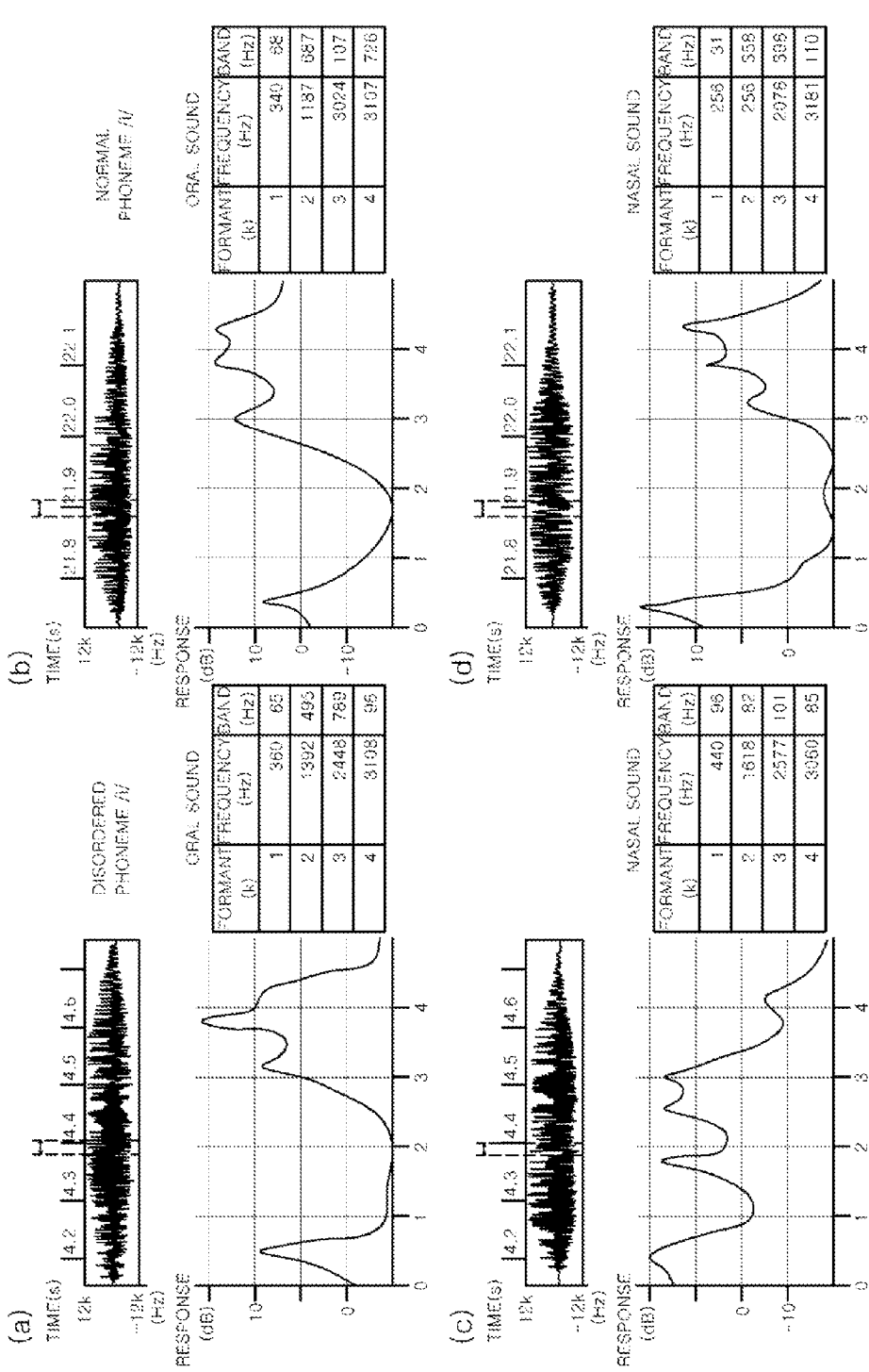
FIG. 5B illustrates charts drawn for explaining an analysis of an example vowel as a disordered voice component.

FIG. 5B illustrates charts drawn for explaining an analysis of an example vowel as a disordered voice component. Referring to FIG. 5, charts for analyzing a disordered phoneme /i/ and a normal phoneme /i/ are illustrated as being divided for an oral sound and a nasal sound.

Referring to (a) and (b) of FIG. 5B regarding an oral sound, there are illustrated charts of a frequency domain corresponding to a section within a dotted line in a time domain. According to the analysis of the charts of the frequency domain corresponding to the section within the dotted line, it can be understood that formant frequencies are similar except that formant frequencies of the third formants are different as one is 2448 Hz and the other is 3024 Hz. Formant bandwidths are generally similar although there are some differences in the third formant and the fourth formant. By comparison in the charts of the frequency domain, it can be determined that the charts of the frequency domain as illustrated in (a) and (b) of FIG. 5B are similar By an analysis method as such, the above-described disordered voice determination unit can determine a voice component of, for example, an oral sound as a normal voice component.

Further, referring to (c) and (d) of FIG. 5B regarding a nasal sound, there are illustrated charts of a frequency domain corresponding to a section within a dotted line in a time domain. According to the analysis of the charts of the frequency domain corresponding to the section within the dotted line, it can be understood that both of formant frequencies and bandwidths are different.

The disordered voice determination unit can determine a voice component (c) of, for example, a nasal sound as a disordered voice component, and the restoration unit can restore a disordered voice component with reference to the phoneme characteristic table. For example, with reference to formant information of a nasal sound of a normal voice hi/ stored in the phoneme characteristic table, the restoration unit can generate a restored voice component by processing the disordered voice component of the nasal sound. Otherwise, the restoration unit can generate a new restored voice component using the formant information stored in the phoneme characteristic table instead of adjusting the disordered voice component of the nasal sound.

The disordered voice processing apparatus according to an exemplary embodiment of the present invention can generate a restored voice signal by synthesizing a voice component of an oral sound and a restored voice component of a nasal sound in (a) regarding a normal voice. According to this exemplary embodiment, it is possible to more effectively restore a disordered voice component as compared with a case where a disordered voice component of an unseparated voice is adjusted.

It will be easily recognized by those skilled in the art that a disordered voice processing method according to various exemplary embodiments of the present invention can be applied to phonemes different from the Korean language using various mechanisms.

Figure 6:
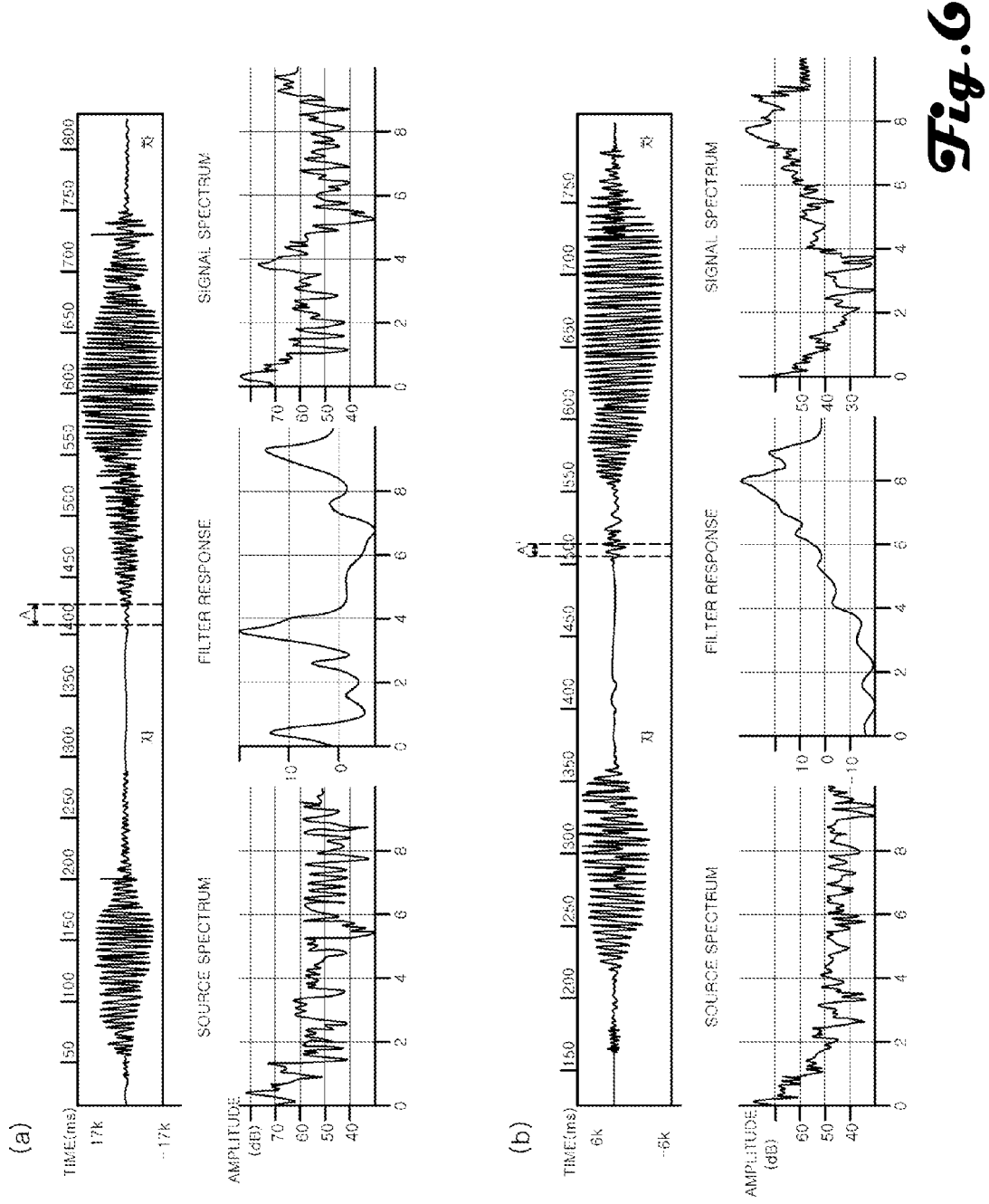
FIG. 6 illustrates charts drawn for explaining an analysis of an example consonant as a disordered voice component.

FIG. 6 illustrates charts drawn for explaining an analysis of an example consonant as a disordered voice component. As illustrated in FIG. 6, (a) of FIG. 6 is divided into a time domain chart of a disordered phoneme /ㅊ (ch)/, and a source spectrum, a filter response and a signal spectrum of a section A, and (b) of FIG. 6 is divided into a time domain chart of a normal phoneme /ㅊ (ch)/, and a source spectrum, a filter response and a signal spectrum of a section A'.

In (a) and (b) of FIG. 6, both of the section A and the section A' of the time domain charts are sections of a pronunciation /ㅊ (ch)/, and the source spectra and the filter responses result from separation and extraction of the pronunciation /ㅊ (ch)/ into a component for a source and a component for a filter by a source-filter algorithm.

Referring to the signal spectra in (a) and (b) of FIG. 6, the signal spectrum of the disordered phoneme /ㅊ (ch)/ in (a) of FIG. 6 and the signal spectrum of the disordered phoneme /ㅊ (ch)/ in (b) of FIG. 6 are not similar to each other and thus are highly likely to be recognized as different pronunciations.

As for each of the source spectrum and the filter response, it can be determined that there are no significant differences between the source spectrum of the disordered phoneme /ㅊ (ch)/ in (a) of FIG. 6 and the source spectrum of the normal phoneme /ㅊ (ch)/ in (b) of FIG. 6 except for some differences in amplitude. The above-described disordered voice determination unit can determine a voice component of, for example, a source as a normal voice component.

Meanwhile, it can be understood that the filter response of the disordered phoneme /ㅊ (ch)/ in (a) of FIG. 6 and the filter response of the normal phoneme /ㅊ (ch)/ in (b) of FIG. 6 are different in both of a formant frequency and a bandwidth. The disordered voice determination unit can determine a voice component of, for example, a filter response as a disordered voice component, and the restoration unit can restore the disordered voice component with reference to the phoneme characteristic table. For example, with reference to filter response information of the normal voice /ㅊ (ch)/ stored in the phoneme characteristic table, the restoration unit can generate a restored voice component by processing the disordered voice component of the filter response.

The disordered voice processing apparatus according to an exemplary embodiment of the present invention can generate a restored voice signal by synthesizing a voice component of a source and a restored voice component of a filter response in (a) regarding a normal signal. As for a consonant, restoration of multiple sections rather than a single section may be needed depending on a kind of a consonant.

FIG. 7 illustrates a chart drawn for explaining an analysis of an example consonant as a disordered voice. FIG. 7 illustrates a time domain chart of a phoneme /ㅊ (ch)/. A section A of the phoneme /ㅊ (ch)/ is a turbulence section, a section B is an aspiration, and a section C is a voice section connected to a vowel.

In order to restore a disordered phoneme /ㅊ (ch)/ to a normal phoneme /ㅊ (ch)/, a restoration process for each of the turbulence section A and the aspiration section B may be demanded. For example, the restoration unit may apply a secondary band-pass filter having a bandwidth of 6 to 8 kHz to the turbulence section A and may adjust a formant with respect to the aspiration section B. Further, the restoration unit may adjust amplitude with respect to the voice section connected to a vowel. Otherwise, the restoration unit may acquire a restored voice component based on a disordered voice component by adjusting duration of the aspiration section B.

FIG. 8 illustrates charts drawn for explaining a result of processing an example disordered voice related to a nasal sound. (a) of FIG. 8 illustrates a chart of a disordered voice signal containing a disordered voice component, and (b) of FIG. 8 illustrates a chart of a restored voice signal containing a restored voice component. (a) of FIG. 8 illustrates a section A and section B of an affricate, and (b) of FIG. 8 illustrates a section A' and a section B' corresponding to the section A and the section B, respectively.

The restoration unit of the disordered voice processing apparatus according to an exemplary embodiment of the present invention can perform restoration by removing of an unnecessary voice in addition to adjustment of a formant and filtering. (a) of FIG. 8 is a chart of a disordered voice, and illustrates that a voice of a section A and section B is a nasal sound generated during a closure duration of a plosive. The restoration unit can acquire a restored voice component from which a disordered voice component is removed by removing the nasal sound. (b) of FIG. 8 is a chart of a restored voice signal from which a nasal sound is removed, and illustrates that amplitude is reduced in the section A' and the section B'.

In addition, the restoration unit can restore a restored voice component by, for example, removing a noise in a high frequency range.

Figure 9:
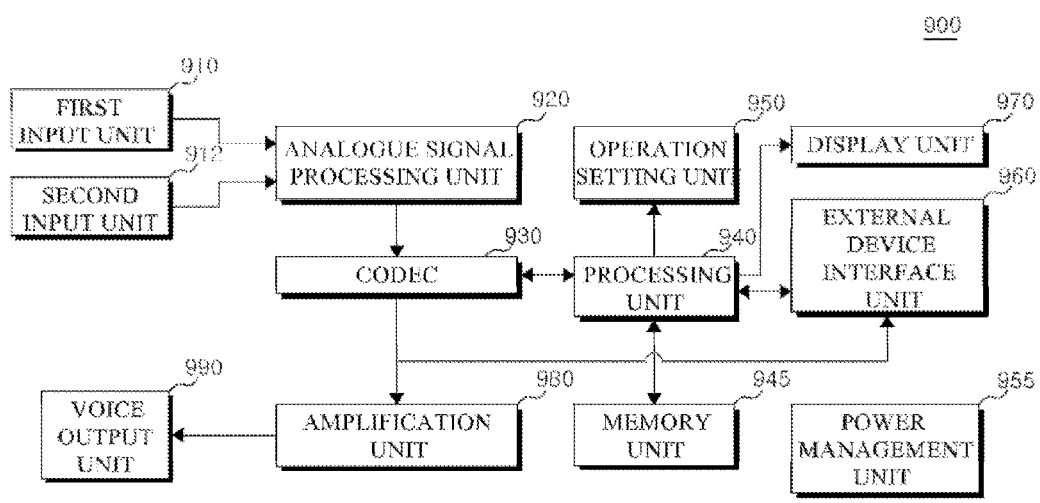
FIG. 9 is a block diagram of a disordered voice processing apparatus according to still another exemplary embodiment of the present invention.

FIG. 9 is a block diagram of a communication device according to still another exemplary embodiment of the present invention. A communication device 900 may include a first input unit 910, an analogue signal processing unit 920, a codec 930, a processing unit 940, a memory unit 945, an operation setting unit 950, a power management unit 955, an external device interface unit 960, a display unit 970, an amplification unit 980, and a voice output unit 990.

The first input unit 910 receives an oral sound signal coming out of the mouth at the time of utterance and converts it into an electric signal and then outputs the electric signal. The communication device may further include a second input unit 912. The second input unit 912 receives a nasal sound signal coming out of the nose at the time of utterance and converts it into an electric signal and then outputs the electric signal. As described above, the second input unit 912 configured to receive a nasal signal may be optional, and if both of the first input unit 910 and the second input unit 912 are used, an oral sound and a nasal sound may be collected as being separated from each other as illustrated above in FIG. 5A.

The analogue signal processing unit 920 may include a noise removal filter and an amplifier, and can generate a voice signal of sufficient intensity based on signals input from the first input unit 910 and the second input unit 912.

The codec 930 converts the processed analogue voice signal into a digital signal, or the processing unit 940 converts a restored digital voice into an analogue signal so as to output it to the voice output unit 990.

The amplification unit 980 amplifies the voice signal applied as being converted into the analogue signal by the codec 930 to a level set by the operation setting unit 950 and outputs the amplified voice signal.

The voice output unit 990 converts the analogue signal applied through the amplification unit 980 into a voice and outputs the voice.

The operation setting unit 950 includes at least one function key, and sets various operation functions for regulating an active mode of voice restoration, an output size of a restored voice, and a sound quality.

The processing unit 940 is configured by implementing the above-described voice recognition, component extraction, restoration, and synthesis algorithms. The processing unit 940 performs a process of restoring a disordered pronunciation to a voice close to a normal voice by the algorithms and transmits a restored signal to the codec or the external device interface unit 960 depending on a mode selected by the operation setting unit 950. The processing unit 940 can be implemented in part, in whole, or in combination of the above-described disordered processing apparatuses according to various exemplary embodiments of the present invention.

The display unit 970 visually outputs an operation status of the processing unit 940 and all information set by the operation setting unit 950.

The memory unit 945 stores a machine language code in which an algorithm necessary for operations of the processing unit 940 is implemented, data, and a phoneme characteristic table required for voice restoration.

If the disordered voice processing apparatus is applied as a separate and independent apparatus, the external device interface unit 960 is configured to be connected to the communication device 900.

The communication device 900 according to the still another exemplary embodiment of the present invention converts input misarticulation into a normal voice and thus enables accurate speech during a phone conversation, resulting in a high-quality voice communication.

Figure 10:
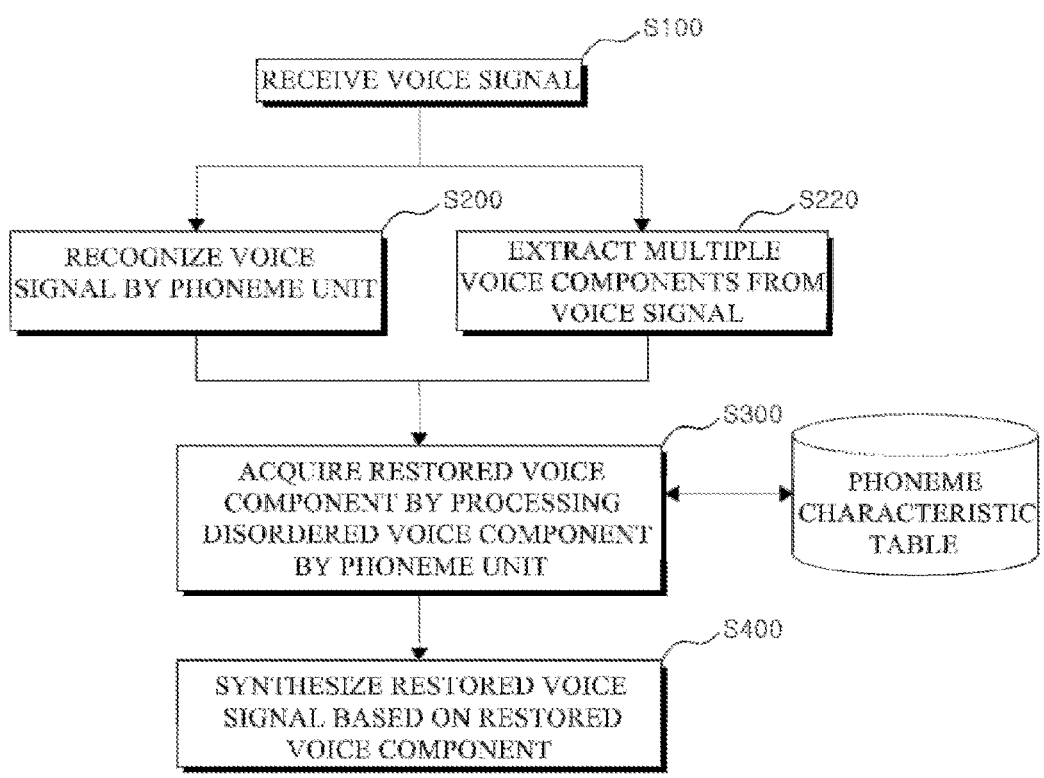
FIG. 10 is a flowchart of a disordered voice processing method according to an exemplary embodiment of the present invention.

FIG. 10 is a flowchart of a disordered voice processing method according to an exemplary embodiment of the present invention. For convenience of explanation, a configuration of the disordered voice processing apparatus as illustrated in FIG. 1 will be referred to hereinafter. Further, all of steps can be independently carried out, but will be explained below as a single process for convenience of explanation.

The disordered voice processing apparatus receives a voice signal through the input unit (S100). The voice signal received by the disordered voice processing apparatus may be an oral sound signal, a nasal sound signal, or a voice signal in which an oral sound and a nasal sound are not separated.

In the disordered voice processing apparatus, the voice recognition unit recognizes the received voice (S200). The disordered voice processing apparatus may refer to a voice corpus in order to recognize a phoneme in a disordered voice. The disordered voice processing apparatus recognizes the currently input voice signal on a basis of a phoneme using the learned classification algorithm.

In the disordered voice processing apparatus, the component extraction unit extracts multiple voice components from the voice signal received from the input unit (S300). The voice components extracted by the component extraction unit may vary depending on a filter or an algorithm used in a component analysis unit, the restoration unit, or the synthesis unit, and they are not limited. The voice extraction unit outputs the extracted voice components to the restoration unit.

In the disordered voice processing apparatus, the restoration unit performs a restoration process to the received voice components on a basis of a phoneme and acquires restored voice components (S400). The voice components processed by the restoration unit may be disordered voice components. The restoration unit performs a restoration process to a disordered voice. The restoration unit receives phonemes separated from the voice recognition unit or phoneme information containing a phoneme section and multiple voice components from the component extraction unit.

The restoration unit can restore a disordered voice component to a normal voice component with reference to, for example, a phoneme characteristic table. The phoneme characteristic table may contain restoration information about disordered voice components and normal voice components. The restoration unit can restore a disordered voice component to a normal voice component by adjusting a formant frequency, a template bandwidth, and the like of the disordered voice component with reference to the phoneme characteristic table. Otherwise, a disordered voice component can be restored to a normal voice component by adjusting the disordered voice component in a time band or a frequency band based on at least one of aspiration, tense, turbulence, and the like.

The restoration unit may adjust duration of a phoneme in a time domain or may adjust for formant connection between a consonant and a vowel that connects phonemes or may adjust a locus frequency.

In the disordered voice processing apparatus, the synthesis unit synthesizes a restored voice signal based on a restored voice component from the restoration unit (S500). The synthesis unit can generate a restored voice signal by synthesizing a restored voice component and other voice components.

The synthesis unit outputs a restored voice signal by synthesizing an excitation signal as a glottal component and a restored voice component. For example, the synthesis unit may synthesize a restored voice signal by synthesizing a glottal component as a normal voice component and a vocal tract component of which a formant frequency is adjusted. In the restored voice signal, a disordered component is restored, and, thus, articulation or pronunciation can be further improved.

Combinations of each block of the accompanying block diagram and each step of the flow chart can be implemented by algorithms or computer program instructions comprised of firmware, software, or hardware. Since these algorithms or computer program instructions can be installed in processor of a universal computer, a special computer or other programmable data processing equipment, the instructions executed through a processor of a computer or other programmable data processing equipment generates means for implementing functions described in each block of the block diagram or each step of the flow chart. Since the algorithms or computer program instructions can be stored in a computer available or computer readable memory capable of orienting a computer or other programmable data processing equipment to implement functions in a specific scheme, the instructions stored in the computer available or computer readable memory can produce items involving an instruction means executing functions described in each block of the block diagram or each step of the flow chart. Since the computer program instructions can be installed in a computer or other programmable data processing equipment, a series of operation steps are carried out in the computer or other programmable data processing equipment to create a process executed by the computer such that instructions implementing the computer or other programmable data processing equipment can provide steps for implementing functions described in functions described in each block of the block diagram or each step of the flow chart.

Further, each block or each step may indicate a part of a module, a segment, or a code including one or more executable instructions for implementing specific logical function(s). Furthermore, it should be noted that in some alternative embodiments, functions described in blocks or steps can be generated out of the order. For example, two blocks or steps illustrated continuously may be implemented simultaneously, or the blocks or steps may be implemented in reverse order according to corresponding functions.

The present invention has been described in more detail with reference to the exemplary embodiments, but the present invention is not limited to the exemplary embodiments. It will be apparent to those skilled in the art that various modifications can be made without departing from the technical sprit of the invention. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

EXPLANATION OF CODES

100, 200, 300: Disordered voice processing apparatus
110, 210, 310: Input unit
120, 220, 320: Voice recognition unit
130, 230, 340: Component extraction unit
140, 250, 350: Restoration unit
150, 260, 360: Synthesis unit
170, 270, 370: Phoneme characteristic table
240, 330: Disordered voice determination unit
Complementary source filter: 280
Lip radiation filter: 290
510: Speaker
520, 910: First input unit
530, 912: Second input unit
540: Separation means
900: Communication device
920: Analogue signal processing unit
930: Codec
940: Processing unit
945: Memory unit
950: Operation setting unit
955: Power management unit
960: External device interface unit
970: Display unit
980: Amplification unit
990: Voice output unit

What is claimed is:

1. A disordered voice processing method comprising:
   receiving a nasal sound signal and an oral sound signal, and the nasal sound signal and the oral sound signal are acquired from an input unit with a separation means for separating the oral sound signal and the nasal sound signal from each other;
   recognizing the nasal sound signal and the oral sound signal by phoneme;
   classifying each of the recognized nasal sound signal and oral sound signal into a normal voice signal and a disordered voice signal using a phoneme characteristic table, wherein the phoneme characteristic table includes information of nasal sound and oral sound of normal voice separately;
   extracting multiple voice components from each of the nasal sound signal and the oral sound signal;
   acquiring restored voice components by processing at least a portion of disordered voice components of the multiple voice components on a basis of a phoneme, wherein the restored voice components are acquired for each of the nasal sound signal and the oral sound signal using the phoneme characteristic table; and
   synthesizing a restored nasal sound signal and a restored oral sound signal based on at least the restored voice components to generate a restored voice signal.

2. The disordered voice processing method according to claim 1,
   wherein the multiple voice components include vocal tract components and glottal components, and
   the disordered voice components are vocal tract components.

3. The disordered voice processing method according to claim 1,
   wherein the acquiring the restored voice components includes acquiring the restored voice component by processing the disordered voice components with respect to a disordered voice signal on a basis of a phoneme.

4. The disordered voice processing method according to claim 1,
   wherein the classifying each of the recognized nasal sound signal and oral sound signal includes classifying the disordered voice signal by applying heuristics.

5. The disordered voice processing method according to claim 1,
   wherein the classifying each of the recognized nasal sound signal and oral sound signal includes determining whether or not each of the nasal sound signal and the oral sound signal is disordered on a basis of a phoneme.

6. The disordered voice processing method according to claim 1,
   wherein the classifying each of the recognized nasal sound signal and oral sound signal is based on the extracted multiple voice components.

7. The disordered voice processing method according to claim 1, further comprising:
   adjusting amplitude or a length of the disordered voice signal.

8. The disordered voice processing method according to claim 1,
   wherein the disordered voice component is a disordered voice component associated with a consonant, and
   acquiring restored voice components includes acquiring the restored voice components by adjusting the disordered voice component with respect to at least one of aspiration, tense and turbulence.

9. The disordered voice processing method according to claim 1, wherein the disordered voice components are disordered voice components with respect to a consonant, a vowel, or a combination of a consonant and a vowel.

10. The disordered voice processing method according to claim 1,
wherein synthesizing the restored nasal sound signal and the restored oral sound signal includes the use of Linear Predictive Coding (LPC).

11. The disordered voice processing method according to claim 1,
wherein the extracting includes extracting the multiple voice components using Linear Predictive Coding (LPC).

12. The disordered voice processing method according to claim 1,
wherein generating the restored voice components includes generating the restored voice components based on a phoneme characteristic table.

13. The disordered voice processing method according to claim 1, further comprising:
filtering the restored nasal sound signal and the restored oral sound signal to compensate the restored voice components.

14. The disordered voice processing method according to claim 1, further comprising:
filtering the restored nasal sound signal and the restored oral sound signal through a lip radiation filter.

15. A disordered voice processing apparatus comprising:
an input unit configured to input a nasal sound signal and an oral sound signal including a separation means for separating the oral sound signal and the nasal sound signal from each other;
a memory configured to store the nasal sound signal and the oral sound signal; and
a processor configured to generate a restored voice signal from the nasal sound signal and the oral sound signal,
wherein the processor is configured:
to recognize the nasal sound signal and the oral sound signal on a basis of a phoneme;
classify each of the recognized nasal sound signal and oral sound signal into a normal voice signal and a disordered voice signal using a phoneme characteristic table, wherein the phoneme characteristic table includes information of nasal sound and oral sound of normal voice separately;
to extract multiple voice components from each of the nasal sound signal and the oral sound signal;
to acquire restored voice components by processing at least a portion of disordered voice components of the multiple voice components on a basis of a phoneme, wherein the restored voice components are acquired for each of the nasal sound signal and the oral sound signal using the phoneme characteristic table; and
to synthesize a restored nasal sound signal and a restored oral sound signal based on at least the restored voice components to generate the restored voice signal.

16. The disordered voice processing apparatus according to claim 15,
wherein the multiple voice components include vocal tract components and glottal components, and
the disordered voice components are vocal tract components.

17. The disordered voice processing apparatus according to claim 15,
wherein the processor is further configured to adjust amplitude or a length of the disordered voice signal.

* * * * *